United States Patent
Kim et al.

[11] Patent Number: 5,859,846
[45] Date of Patent: Jan. 12, 1999

[54] FULLY-INTERCONNECTED ASYNCHRONOUS TRANSFER MODE SWITCHING APPARATUS

[75] Inventors: Kyeong Soo Kim; Hyup Jong Kim, both of Daejeon, Rep. of Korea

[73] Assignees: Electronics and Telecommunications Research Institute, Daejeon; Korea Telecommunication Authority, Seoul, both of Rep. of Korea

[21] Appl. No.: 685,527

[22] Filed: Jul. 24, 1996

[30] Foreign Application Priority Data

Dec. 19, 1995 [KR] Rep. of Korea ...................... 95-52159

[51] Int. Cl.[6] .................................................. H04L 12/56
[52] U.S. Cl. ............................................ 370/389; 340/395
[58] Field of Search ..................................... 370/389, 395, 370/394, 464, 471, 365, 366, 367, 364, 362, 392, 396, 397, 398, 399, 400, 408, 411, 412, 413, 419, 423, 428, 474, 537, 535, 907; 359/117, 118

[56] References Cited

U.S. PATENT DOCUMENTS 5,557,609  9/1996  Shobatake et al. ..................... 370/395
5,557,611  9/1996  Cappellari et al. ..................... 370/395

*Primary Examiner*—Dang Ton
*Attorney, Agent, or Firm*—Nixon & Vanderhye, P.C.

[57] ABSTRACT

A fully-interconnected ATM switching apparatus comprising a plurality of line interface circuits, each of the line interface circuits including an input port driver for extracting an SDH transmission frame containing cell data with a fixed length and a connection identifier from an input signal, appending a routing tag to the extracted SDH transmission frame and outputting the resultant SDH transmission frame through an input dedicated bus and an output port driver for receiving a cell stream from an output dedicated bus, removing the routing tag from the received cell stream, translating a channel identifier in the connection identifier and transferring the resultant SDH transmission frame to an adjacent node, a system clock distributor for generating a clock signal, an initialization controller for controlling system initialization and restart operations, a switch maintenance controller for performing a switch maintenance control operation in response to a network managing cell, a switch call processing controller for performing a call processing operation, a switch module controller for controlling a switching operation, and a plurality of switch output multiplexers for switching cells from the input port drivers to the output port drivers under the control of the switch module controller.

14 Claims, 10 Drawing Sheets

FULLY-INTERCONNECTED ASYNCHRONOUS TRANSFER MODE SWITCHING APPARATUS

BACKGROUND OF THE INVENTION

1. Field of the invention

The present invention relates in general to fully-interconnected asynchronous transfer mode (referred to hereinafter as ATM) switching apparatus, and more particularly to a fully-interconnected ATM switching apparatus for providing individual interconnections between all input ports and all output ports and processing a burst traffic by performing two-stage buffering, speed gain control, buffer flow control and statistical multiplexing operations.

2. Description of the Prior Art

The users have required various services of good quality according to the growth of communication techniques. In order to fulfill the requirements of the users, an ATM broadband integrated service digital network (B-ISDN) has been proposed to provide a consecutive service such as a voice service, a high-speed data service such as a file transmission service and a burst data service such as a variable bit rate (VBR) real-time video service on the same transmission link. Under such an environment, multiplexing and switching processing means is the kernel of a communication system and it does not require a time division multiplexing (TDM) method based on a synchronous transfer mode (STM) but a fixed length cell switching method based on an ATM. A construction for embodying such a switching method is shown in FIG. 1.

FIG. 1 is a block diagram illustrating the general construction of a switching apparatus. As shown in this drawing, the switching apparatus comprises a plurality of subdivided line interface circuits 1, a switching function unit 2 and a system manager 3.

Each line interface circuit 1 includes means for performing an interfacing operation to a unit transmission frame. The input line interface circuit 1 performs clock recovery from received signal clock restoration, cell recovery and cell processing operations and then applies a cell destination information (routing tag) to the switching function unit 2 on the basis of a connection identifier and the associated information which is written in a table manager. The switching function unit 2 routs a cell to the associated destination in response to the cell destination information from the input line interface 1. The output line interface circuit 1 receives the cell routed from the switching function unit 2 and changes a channel identifier in the received cell. Then, the output line interface circuit 1 transmits the resultant cell to a subscriber line. In this manner, the cell switching operation is performed.

Constructions of such a switching apparatus are generally classified into the shared memory type, shared bus type, space division type and fully-interconnected type according to embodied architectures. Such switching constructions have their inherent advantages and disadvantages such as cell delay, cell loss, interconnection network complexity, scale extensibility and implementation complexity. For this reason, it is important that the switching apparatus has an optimized construction according to its application and position.

A space division switch such as the Batcher Banyan switch is desirable to readily provide the scale extensibility and reduce the number of interconnections, but has a disadvantage in that it can not provide individual interconnections of one input port to all output ports. For this reason, it is impossible to avoid a cell collision in the switching network. Such an internal blocking phenomenon results in a reduction in performance.

Many efforts such as increasing the number of internal interconnections or the internal processing speed have been made to overcome the above problem with the space division switch. However, such efforts make the switch construction more complex. Noticeably, the number of interconnections is an important factor in the large scale switching construction but it is not an obstacle to an ATM local area network (referred to hereinafter as LAN) hub switch and a small scale ATM switch for a private campus network. Also, switches require a point-to-multipoint switching function for the provision of a multicasting service as well as a simple point-to-point switching function.

Many fully-interconnected switches have been used. The fully-interconnected switches have excellent performance because they can perform a multicasting function without cell copy function. Examples of the fully-interconnected switches will hereinafter be described with reference to FIGS. 2A to 2D.

FIG. 2A is a block diagram illustrating the construction of a conventional cell switching apparatus of the output buffer type employing broadcasting dedicated buses. As shown in this drawing, each of the line interface circuits LI comprises an input driver which is fully coupled to all switch output function units SOFU through an input connector and a broadcasting dedicated bus. Each of the switch output function units SOFU is connected one-to-one to an output driver of each of the line interface circuits LI.

In the case where the system has N input connectors, each switch output function unit SOFU is basically provided with an N-input/1-output multiplexer for receiving the maximum N ATM information cells at a time and outputting the received cells one by one according to an internal service manner.

Each switch output function unit SOFU compares a destination address of the information cell received through the input bus with an inherent address thereof. If the two addresses are the same as a result of the comparison, the switch output function unit SOFU accepts the received information cell. However, in the case where the two addresses are not the same as a result of the comparison, the switch output function unit SOFU discards the received information cell.

The representative switches with the above-mentioned construction are shown in FIGS. 2B to 2D.

FIG. 2B is a block diagram illustrating the construction of a knockout switch employing a knockout concentrator, which is disclosed in U.S. Pat. No. 4,754,451. In the knockout switch, the output addresses of input cells to be routed are classified according to $log_2N$ bits. Also, the input driver of the line interface circuit LI previously translates an output channel identifier. For this reason, separate function circuits must be added in performing the multicasting switching operation. Further, although the output shared buffer has a redundancy, a cell loss is inevitable when an output cell collision occurs. As a result, the performance may significantly be reduced in the case where a burst traffic is applied.

FIG. 2C is a block diagram illustrating the construction of a switch routing module (SRM) of a multi-stage self-routing switch (MSSR), proposed by Fujitsu in Japan. A VCI controller (VCC) at the input stage of the line interface circuit LI analyzes an input cell and outputs cell data with desired output routing information and a translated channel identifier in accordance with the analyzed result. As a result, copied cells cannot have different channel identifiers for the multicasting operation. Also, switch output buffers are multiplexed in a simple hub-polling mechanism manner at the same speed as that of the output driver of the line interface circuit LI, resulting in a reduction in performance in the case where a burst traffic is applied.

FIG. 2D is a block diagram illustrating the construction of a cylinder switch, proposed by Colombia University in U.S.A. The cylinder switch employs ring buffer multiplexing means. For this reason, the cylinder switch has a complex slotted ring mechanism and priority control and cell order maintenance functions for the output control, resulting in a complexity in construction. Also, additional bytes must be appended to cell data to perform such control functions. As a result, the transmission efficiency may be reduced.

SUMMARY OF THE INVENTION

Therefore, the present invention has been made in view of the above problems, and it is an object of the present invention to provide a fully-interconnected ATM switching apparatus in which, when the number of inputs is small, a switching construction and a control method are made relatively simple while a buffer reduction effect is maintained, so that the switching apparatus can be stably and readily embodied, maintain the performance when a burst traffic is applied, have no internal blocking and reduce a cell loss resulting from an output cell collision.

In accordance with the present invention, the above and other objects can be accomplished by a provision of a fully-interconnected asynchronous transfer mode switching apparatus comprising a plurality of line interface means, each of the plurality of line interface means including input port drive means for converting an input optical signal into an electrical signal, recovering a clock signal from the converted electrical signal, extracting a SDH(Synchronous Digital Hierarchy) transmission frame from the converted electrical signal in response to the recovered clock signal, the extracted SDH transmission frame containing cell data with a fixed length and a connection identifier, appending a routing tag to the extracted cell from SDH frames, outputting the resultant cell Data and the recovered clock signal through an input dedicated bus, extracting a signalling cell or a network managing cell terminating at the system from the converted electrical signal and outputting the extracted signalling cell or network managing cell through a first internal dedicated bus, and output port drive means for receiving a cell stream from an output dedicated bus, removing the routing tag from the received cell stream, translating a connection identifier into corresponding channel identifier, transferring the resultant cell streams to an adjacent node, receiving the signalling cell or the network managing cell from a second internal dedicated bus and transferring the received signalling cell or network managing cell to the adjacent node; system clock distribution means for receiving the recovered clock signal from the input port drive means in each of the plurality of line interface means through a clock dedicated bus, providing a clock signal synchronously with the received clock signal and according to network synchronous system and structure and distributing its self-clock signal if an error is temporarily present in the received clock signal; initialization control means for controlling system initialization and restart operations; switch maintenance control means for performing an entire system initialization control operation in response to initialization information and a control signal from the initialization control means and performing a switch maintenance control operation in response to the network managing cell from the input port drive means in each of the plurality of line interface means; switch call processing control means for receiving the signalling cell or the network managing cell from the input port drive means in each of the plurality of line interface means through the first internal dedicated bus, preprocessing the received signalling cell or network managing cell, outputting the preprocessed cell to the switch maintenance control means if the received cell is the network managing cell, performing a call processing operation by analyzing a message of the preprocessed cell if the received cell is the signalling cell and outputting connection information containing a channel identifier and a routing tag to each of the plurality of line interface means when a connection is set based on the call processing operation; switch module control means for receiving the clock signal from the system clock distribution means, performing an initialization operation under the control of the initialization control means, outputting a control signal through a control dedicated bus under the control of the switch maintenance control means, checking operation and malfunction states, reporting the checked result to the switch maintenance control means and performing a duplexed function of replacing a faulty switch board with a normal switch board; and a plurality of switch output multiplexing means, each of the plurality of switch output multiplexing means receiving successive cells from the input port drive means in the plurality of line interface means through the input dedicated buses, each of the received cells containing cell data, a cell enable signal, a start-of-cell signal and a synchronous clock signal, temporarily storing the received cells, performing a received cell selection operation to preferentially read the stored cells corresponding to ones of the input port drive means with high generation frequency and outputting the read cells through the output dedicated bus under the control of the switch module control means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
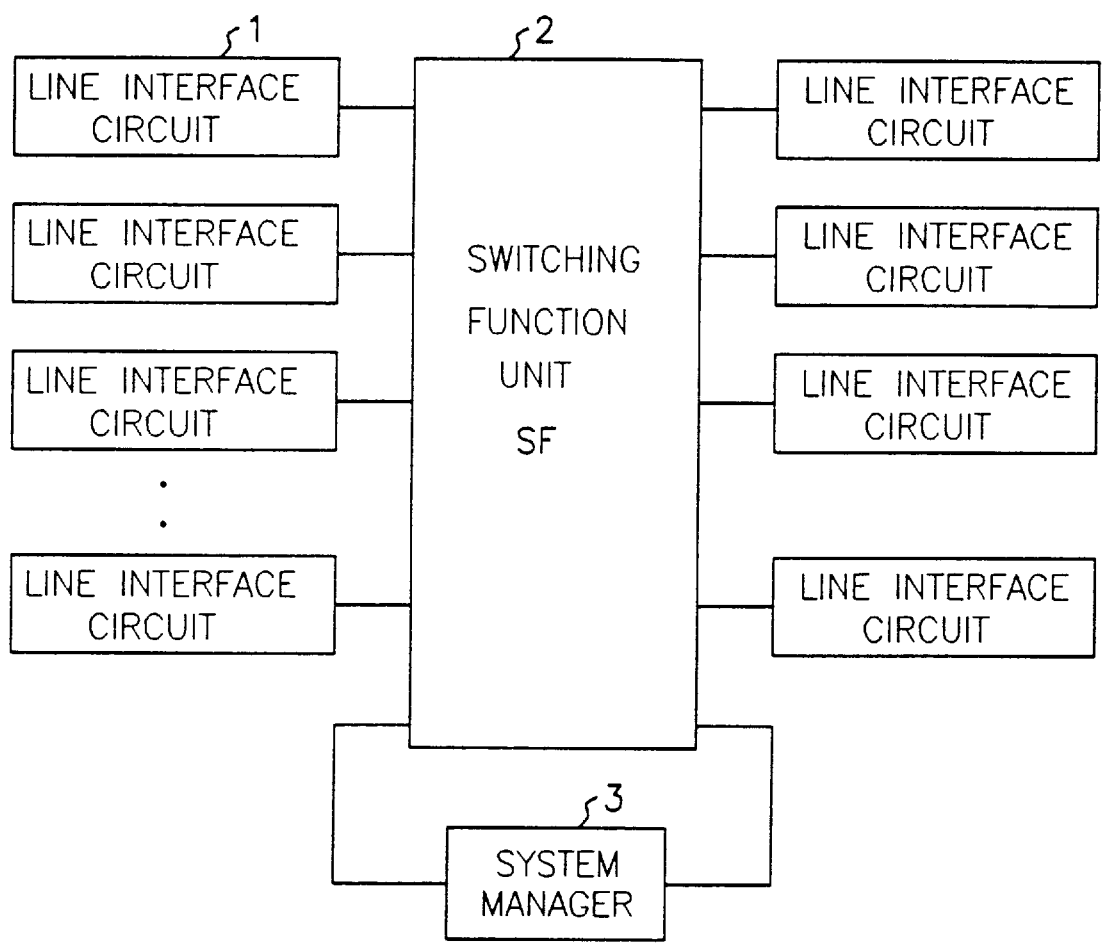
FIG. 1 is a block diagram illustrating the general construction of a switching apparatus.
Figure 2A:
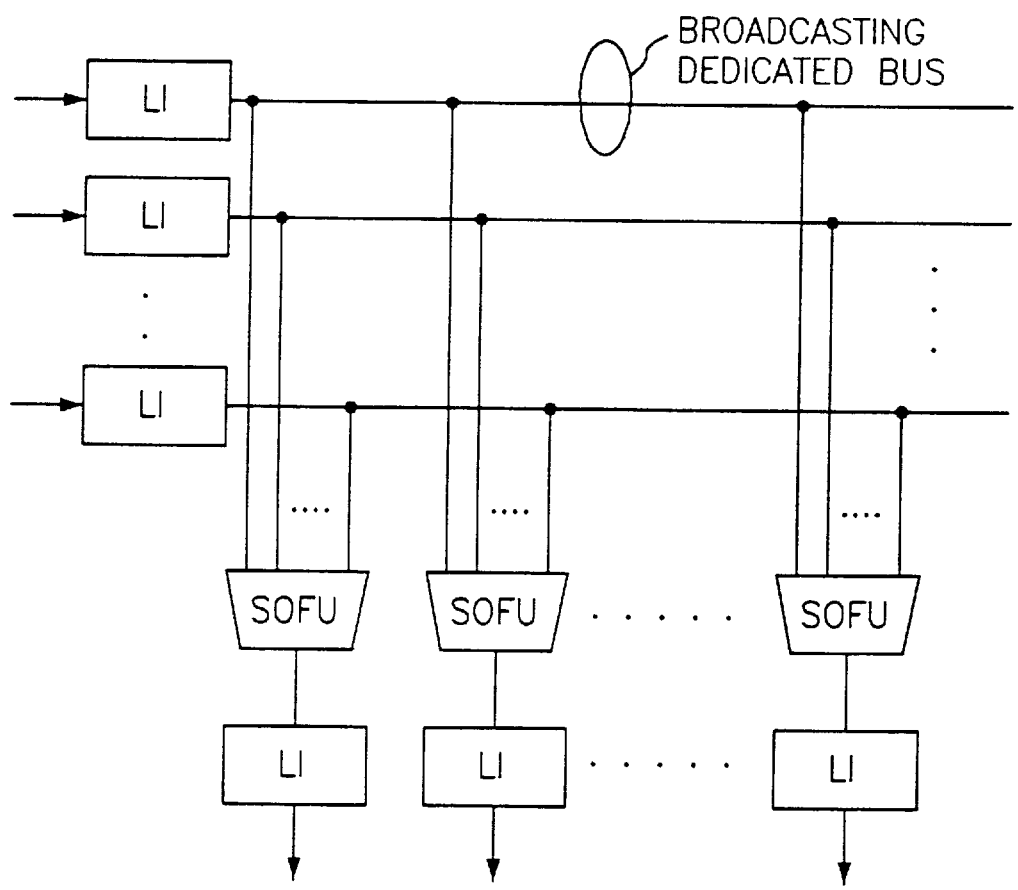
FIGS. 2A to 2D are block diagrams illustrating various constructions of a conventional fully-interconnected switching apparatus.
Figure 2B:
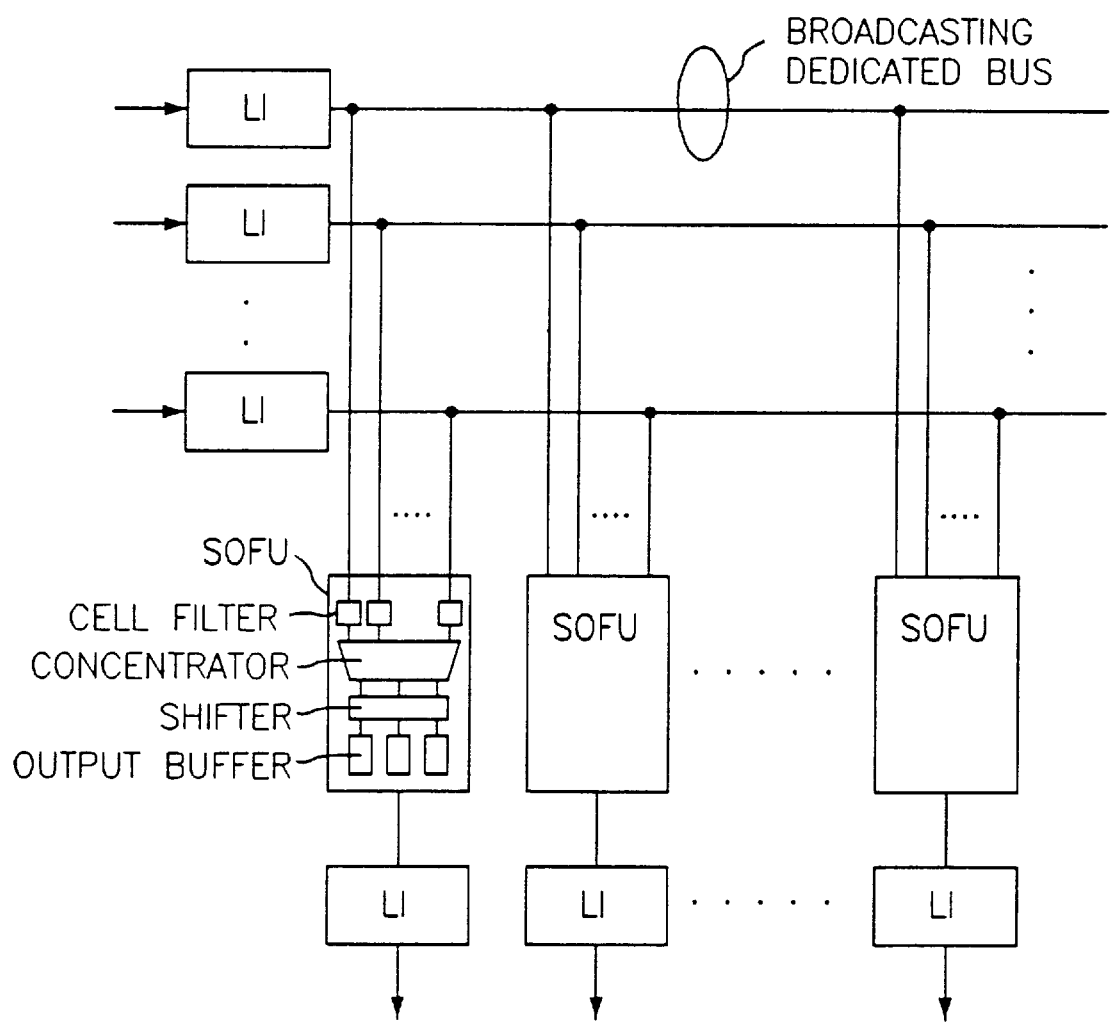
Figure 2C:
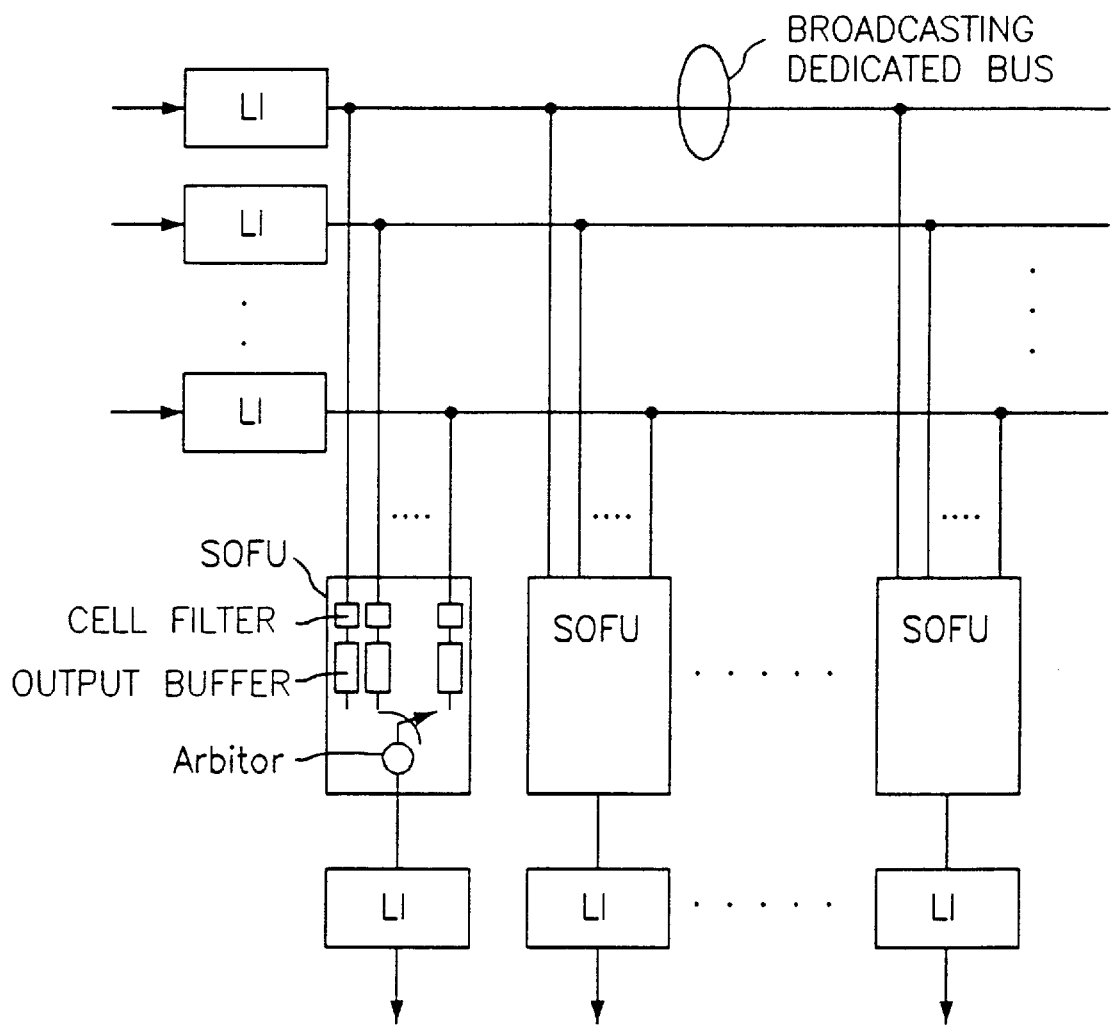
Figure 2D:
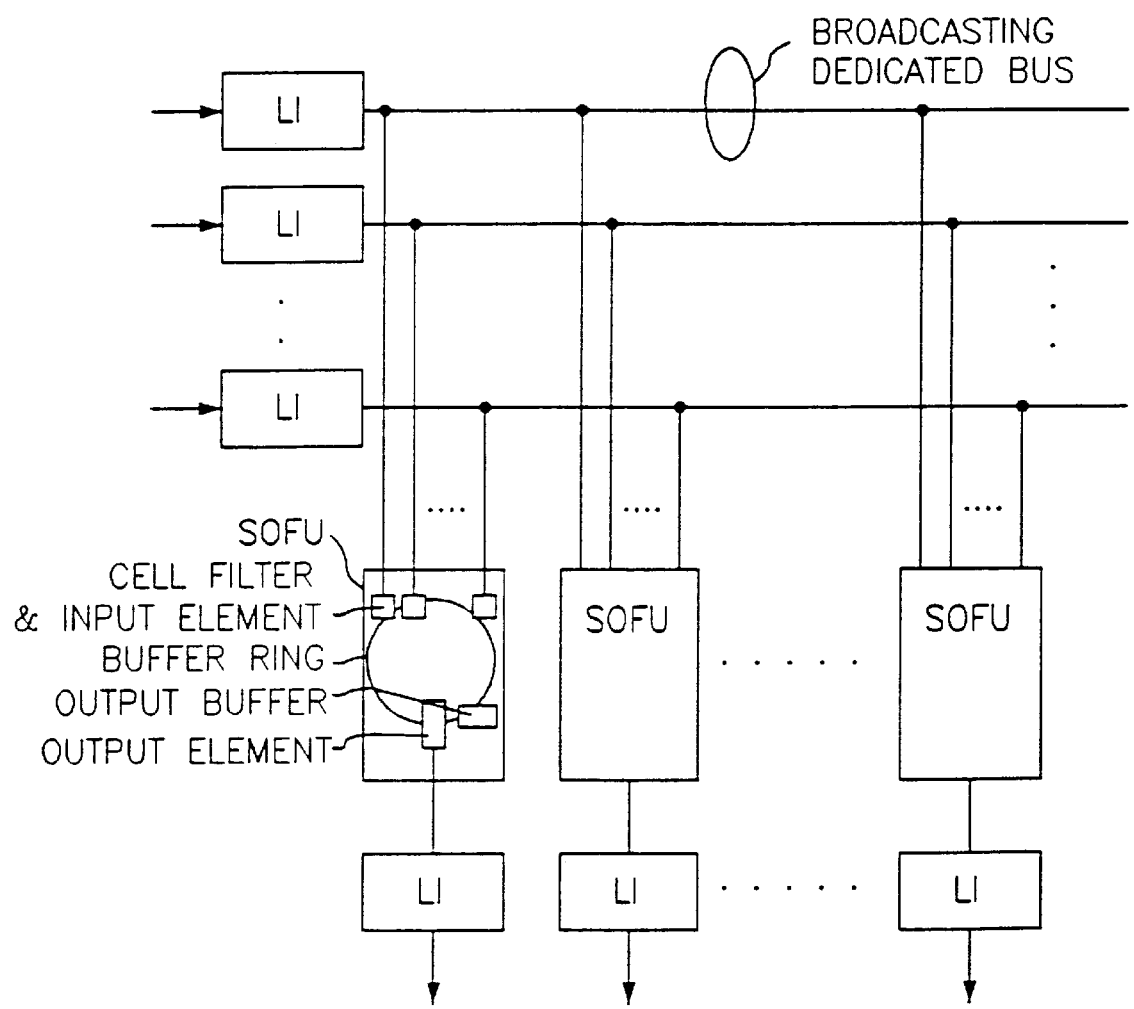
Figure 3:
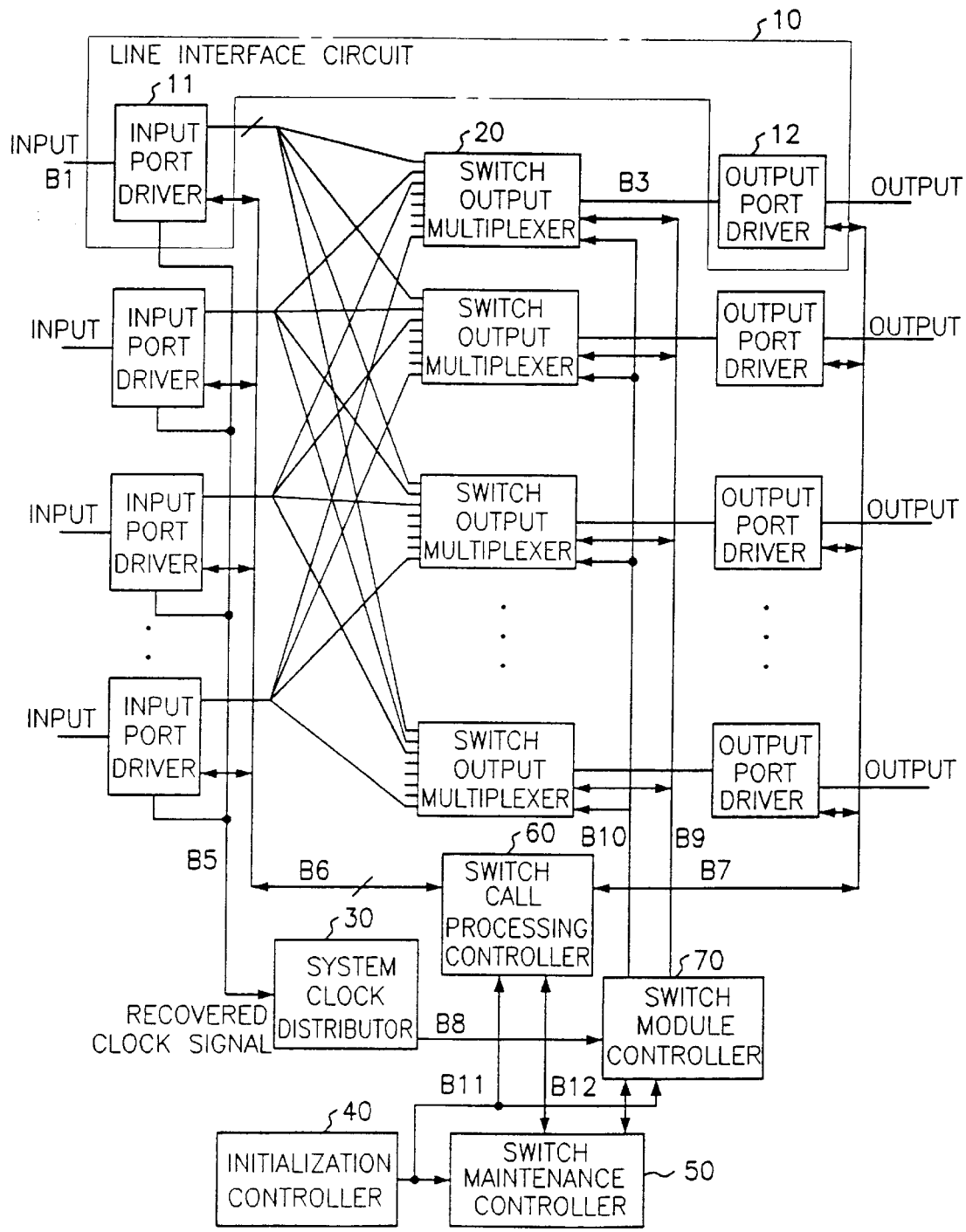
FIG. 3 is a block diagram illustrating the construction of a fully-interconnected ATM switching apparatus in accordance with an embodiment of the present invention.

Referring to FIG. 3, there is shown, in block form, the construction of a fully-interconnected ATM switching apparatus in accordance with an embodiment of the present invention. In this drawing, the reference numerals 10 designate line interface circuits, the reference numerals 20 designate switch output multiplexers, the reference numeral 30 designates a system clock distributor, the reference numeral 40 designates an initialization controller, the reference numeral 50 designates a switch maintenance controller, the reference numeral 60 designates a switch call processing controller and the reference numeral 70 designates a switch module controller.

Each line interface circuit 10 includes an input port driver 11 for converting an input optical signal into an electrical signal, recovering a clock signal from the converted electrical signal and extracting a synchronous digital hierarchy (referred to hereinafter as SDH) transmission frame from the converted electrical signal in response to the recovered clock signal. The extracted SDH transmission frame contains cell data with a fixed length and a connection identifier VPI/VCI. Also, the input port driver 11 appends cell destination information (routing tag) to the extracted SDH transmission frame and outputs the resultant SDH transmission frame and the recovered clock signal to the plurality of switch output multiplexers 20 through an input dedicated bus B2. Further, the input port driver 11 extracts a signalling cell or a network managing cell terminating at the system from the converted electrical signal and outputs the extracted signalling cell or network managing cell to the switch call processing controller 60 through an internal dedicated bus B6. Each line interface circuit 10 also includes an output port driver 12 for receiving a cell stream from a corresponding one of the switch output multiplexers 20 through an output dedicated bus B3, removing the routing tag from the received cell stream, translating a channel identifier in the connection identifier VPI/VCI and transferring the resultant SDH transmission frame to an adjacent node. Also, the output port driver 12 receives the signalling cell or the network managing cell from the switch call processing controller 60 through an internal dedicated bus B7 and transfers the received signalling cell or network managing cell to the adjacent node within the limits of no effect on a user service.

The operation of the fully-interconnected ATM switching apparatus with the above-mentioned construction in accordance with the embodiment of the present invention will hereinafter be described in detail.

In each line interface circuit 10, the input port driver 11 converts an input optical signal into an electrical signal and recovers a clock signal from the converted electrical signal. The input port driver 11 also extracts an SDH transmission frame from the converted electrical signal in response to the recovered clock signal. The extracted SDH transmission frame contains cell data with a fixed length and a connection identifier VPI/VCI. Then, the input port driver 11 appends cell destination information (routing tag) to the extracted SDH transmission frame and outputs the resultant SDH transmission frame and the recovered clock signal to all the switch output multiplexers 20 through the input dedicated bus B2. Further, the input port driver 11 extracts a signalling cell or a network managing cell terminating at the system from the converted electrical signal and outputs the extracted signalling cell or network managing cell to the switch call processing controller 60 through the internal dedicated bus B6.

Each switch output multiplexer 20 is adapted to receive successive cells from the input port drivers 11 in the line interface circuits 10 through the input dedicated buses B2. Each of the received cells contains cell data, a cell enable signal CEN, a start-of-cell signal SOC and a synchronous clock signal CLK. The switch output multiplexer 20 performs a received cell selection operation using input port dedicated temporary storage means (internal buffers). In other words, the switch output multiplexer 20 temporarily stores the received cells in the temporary storage means and preferentially reads the cells stored in ones of the temporary storage means corresponding to ones of the input port drivers 11 with high generation frequency. Then, the switch output multiplexer 20 stores the read cells in an output buffer and outputs the stored cells in the form of a cell stream synchronously with an external network synchronous clock signal.

The switch module controller 70 is adapted to output a control signal to each switch output multiplexer 20 through a control dedicated bus B9 to control it. The switch module controller 70 checks operation and malfunction states of each switch output multiplexer 20 and reports the checked result to the switch maintenance controller 50 which is a managing processor. Further, the switch module controller 70 performs a duplexed function of replacing (board-replacing) a faulty one of the switch output multiplexers 20 with a normal one of the switch output multiplexers 20.

The output port driver 12 in each line interface circuit 10 receives a cell stream from the corresponding switch output multiplexer 20 through the output dedicated bus B3. Then, the output port driver 12 removes the routing tag from the received cell stream, translates a channel identifier in the connection identifier VPI/VCI and transfers the resultant SDH transmission frame to an adjacent node. Also, the output port driver 12 receives the signalling cell or the network managing cell from the switch call processing controller 60 through the internal dedicated bus B7 and transfers the received signalling cell or network managing cell to the adjacent node within the limits of no effect on a user service.

In practice, the input port driver 11 and the output port driver 12 are embodied in the same line interface circuit 10. The line interface circuits 10 have the same board form in a homogeneous network. But, the line interface circuits 10 may have different board forms in an ATM LAN hub switch because a public network connection board may be present together with the existing LAN connection board in the ATM LAN hub switch.

The system clock distributor 30 is adapted to receive the recovered clock signal from the input port driver 11 in each line interface circuit 10 through a clock dedicated bus B5 and to provide a clock signal to the switch module controller 70 through a clock dedicated bus B8 synchronously with the received clock signal and according to network synchronous system and structure. If an error is temporarily present in the received clock signal, the system clock distributor 30 distributes its self-clock signal to the switch module controller 70 through the clock dedicated bus B8 so that the switching operation can normally be performed. The switch module controller 70 outputs the clock signal received from the system clock distributor 30 to the switch output multiplexers 20 through a clock dedicated bus B10.

The switch call processing controller 60 receives the signalling cell or the network managing cell from the input port driver 11 in each line interface circuit 10 through the internal dedicated bus B6 and preprocesses the received signalling cell or network managing cell. Then, if the received cell is the network managing cell, the switch call processing controller 60 outputs the preprocessed cell to the switch maintenance controller 50. However, in the case where the received cell is the signalling cell, the switch call processing controller 60 performs a call processing operation by analyzing a message of the preprocessed cell. When a connection is set based on the call processing operation, the switch call processing controller 60 stores connection information such as a channel identifier and a routing tag in a connection table in each line interface circuit 10.

The initialization controller 40 is a block for controlling system initialization and restart operations. The initialization controller 40 outputs initialization information and a control signal to the switch module controller 70 and the switch maintenance controller 50 through a control dedicated bus B11. In response to the initialization information and control signal from the initialization controller 40, the switch maintenance controller 50 performs an entire system initialization control operation. Also, upon receiving the initialization information and control signal from the initialization controller 40, the switch module controller 70 performs an initialization operation for the switch output multiplexers 20.

Figure 4:
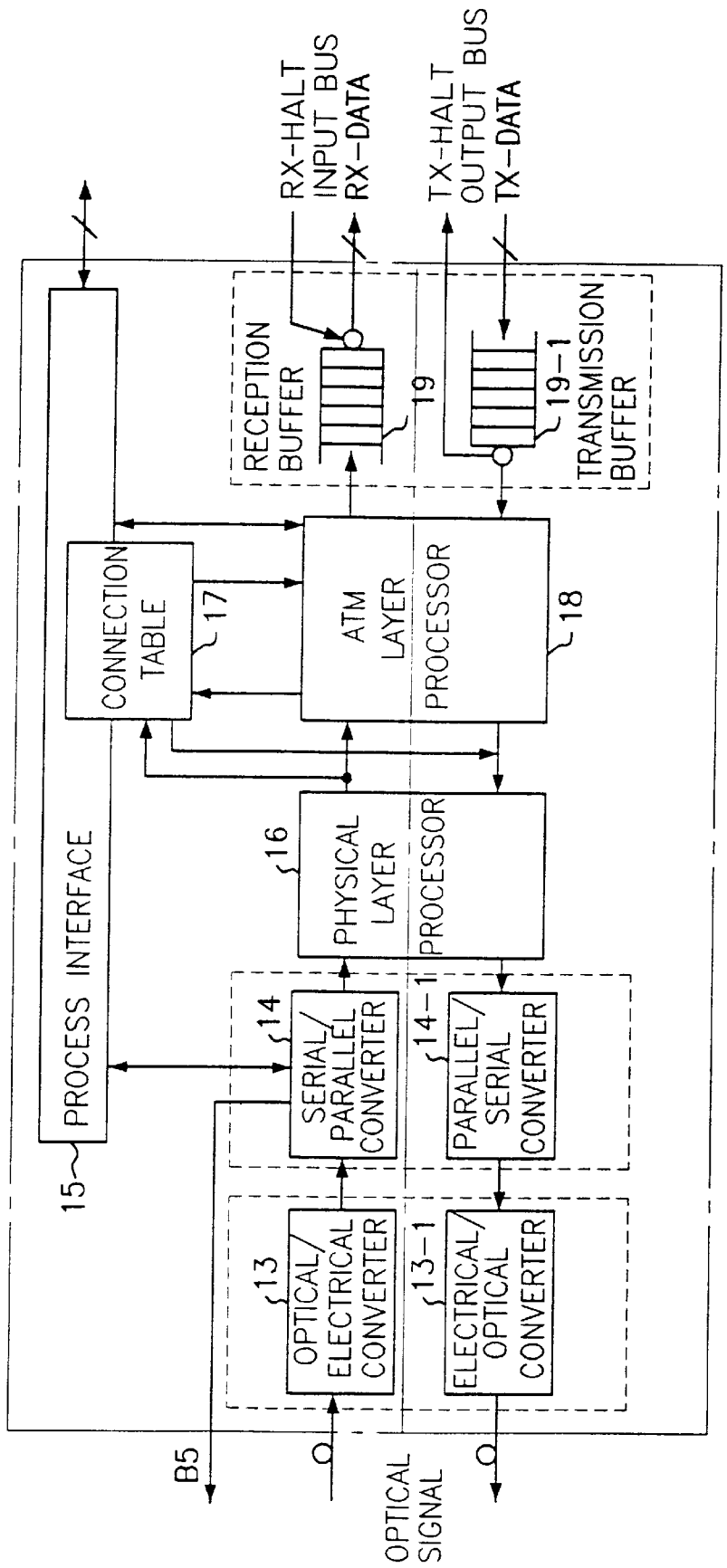
FIG. 4 is a detailed block diagram of a line interface circuit in FIG. 3.

FIG. 4 is a detailed block diagram of each line interface circuit 10 in FIG. 3. As mentioned above, the line interface circuit 10 is provided with the input port driver 11 for performing the reception function and the output port driver 12 for performing the transmission function.

As shown in FIG. 4, the line interface circuit 10 includes an optical/electrical converter 13 for converting the input optical signal into the electrical signal, a serial/parallel converter 14 for recovering the clock signal from an output signal from the optical/electrical converter 13 and converting serial bit data of the output signal from the optical/electrical converter 13 into 8-bit parallel data, a process interface 15 for receiving a control signal and connection information such as a channel identifier and a routing tag from the switch call processing controller 60, and a physical hierarchy processor 16 for transferring the recovered clock signal from the serial/parallel converter 14 to the system clock distributor 30. The physical hierarchy processor 16 is operated in response to the control signal received by the process interface 15 to extract an SDH transmission frame from the parallel data from the serial/parallel converter 14 and to perform cell boundary identification and cell header error check operations with respect to the extracted SDH transmission frame to extract a busy cell therefrom. Also, the physical hierarchy processor 16 converts an input busy cell into an SDH transmission frame. Further, the physical hierarchy processor 16 performs a physical hierarchy function on an ATM protocol such as a physical hierarchy operation and maintenance (referred to hereinafter as OAM) function.

The line interface circuit 10 further includes a connection table 17 connected to the process interface 15 for storing the connection information received by the process interface 15 therein. The connection table 17 compares a connection identifier VPI/VCI in a cell header from the physical hierarchy processor 16 with that in the stored connection information, appends a cell format and a routing tag to the cell header in accordance with the compared result and produces the resultant cell header.

The line interface circuit 10 further includes an ATM hierarchy processor 18 for receiving the busy cell from the physical hierarchy processor 16 and the cell header from the connection table 17. The ATM hierarchy processor 18 extracts a header from the received busy cell and converts the extracted cell header to the received cell header. The ATM hierarchy processor 18 also outputs the internal signalling cell to the switch call processing controller 60 through the process interface 17. Further, the ATM hierarchy processor 18 reads a stored cell, extracts a header from the read cell and outputs the extracted cell header to the connection table 17 to change a connection identifier in the extracted cell header and supply the resultant cell header to the physical hierarchy processor 16. Moreover, the ATM hierarchy processor 18 performs an ATM hierarchy function such as an ATM hierarchy OAM function.

The line interface circuit 10 further includes a reception buffer 19 for receiving a cell from the ATM hierarchy processor 18 and outputting the received cell to the switch output multiplexers 20 through the input dedicated bus B2, a transmission buffer 19-1 for receiving a cell from the corresponding switch output multiplexer 20 through the output dedicated bus B3, storing the received cell therein and outputting the stored cell to the ATM hierarchy processor 18, a parallel/serial converter 14-1 for converting parallel data from the physical hierarchy processor 16 into serial data, and an electrical/optical converter 13-1 for converting a serial electrical signal from the parallel/serial converter 14-1 into an optical signal.

The operation of the line interface circuit 10 with the above-mentioned construction in accordance with the embodiment of the present invention will hereinafter be described in detail.

The optical/electrical converter 13 converts an input optical signal into a serial bit electrical signal and outputs the converted serial bit electrical signal to the serial/parallel converter 14. The serial/parallel converter 14 recovers the clock signal from the serial bit electrical signal from the optical/electrical converter 13 and converts the serial bit electrical signal into 8-bit parallel data. Then, the serial/parallel converter 14 supplies the converted 8-bit parallel data to the process interface 15.

The physical hierarchy processor 16 extracts an SDH transmission frame from the 8-bit parallel data from the serial/parallel converter 14 and performs the cell boundary identification and cell header error check operations with respect to the extracted SDH transmission frame to extract a busy cell therefrom. The physical hierarchy processor 16 then supplies the extracted busy cell to the connection table 17 and the ATM hierarchy processor 18. Noticeably, the physical hierarchy processor 16 is operated under the control of the switch call processing controller 60 through the process interface 17.

The connection table 17 receives the busy cell from the physical hierarchy processor 16 and checks cell output information on the basis of a connection identifier VPI/VCI in a header of the received cell. As a result of the checking operation, the connection table 17 appends a routing information byte (routing tag) to the header of the received cell and supplies the resultant cell header to the ATM hierarchy processor 18. Also, the connection table 17 discriminates whether the received cell is an internal signalling cell or an ATM cell and supplies the discriminated cell format to the ATM hierarchy processor 18.

Figure 6A:
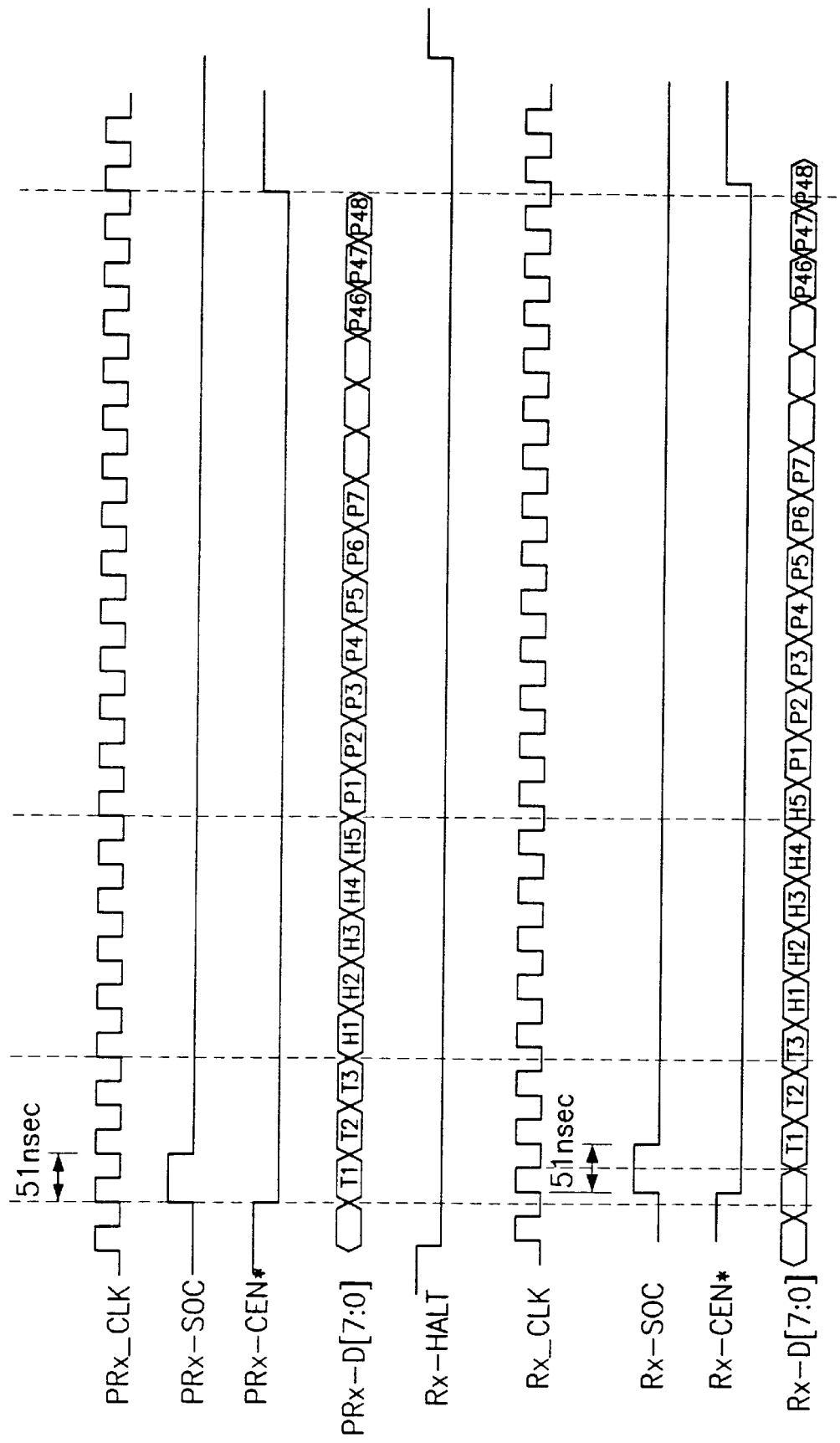
FIGS. 6A and 6B are timing diagrams illustrating the operation of the fully-interconnected ATM switching apparatus in accordance with the embodiment of the present invention.

The ATM hierarchy processor 18 receives the busy cell from the physical hierarchy processor 16 and the cell header from the connection table 17. The ATM hierarchy processor 18 extracts a header from the received cell and converts the extracted cell header to the received cell header. In the case where the received cell is the ATM cell, the ATM hierarchy processor 18 applies it to the reception buffer 19 in response to a start-of-cell signal PRx-SOC and a cell enable signal PRx-CEN* as shown in FIG. 6A and synchronously with a cell clock signal PRx-CLK as shown in FIG. 6A. On the other hand, in the case where the received cell is the internal signalling cell, the ATM hierarchy processor 18 applies it to the switch call processing controller 60 through the process interface 17.

The reception buffer 19 receives the cell from the ATM hierarchy processor 18 and stores the received cell therein. If the switch output multiplexers 20 are not in a reception disable state resulting from a temporary overflow thereof, namely, if Rx-HALT=0, the reception buffer 19 outputs the stored cell to all the switch output multiplexers 20 through the input dedicated bus B2. At this time, the output cell from the reception buffer 19 contains control signals of 3 bits (cell enable signal CEN, start-of-cell signal SOC and synchronous clock signal CLK) and byte data.

Noticeably, one input cell may be required to be outputted to a plurality of output stages. For this reason, a newly configured routing information region must represent all the desired output stages. In this connection, the routing information contains bit positions and values based on a bit addressing method to specify the corresponding output port drivers 12.

Further, a connection identifier VPI/VCI in the input cell is substituted with internal connection identifier information to make a distinction between cell units in the apparatus and to assign a new output connection identifier VPI/VCI to the connection table 17 in the output port driver 12. Therefore, the present invention can provide a point-to-multipoint switching function as well as a point-to-point switching function by merely configuring the routing information region without requiring any separate function module.

Figure 6B:
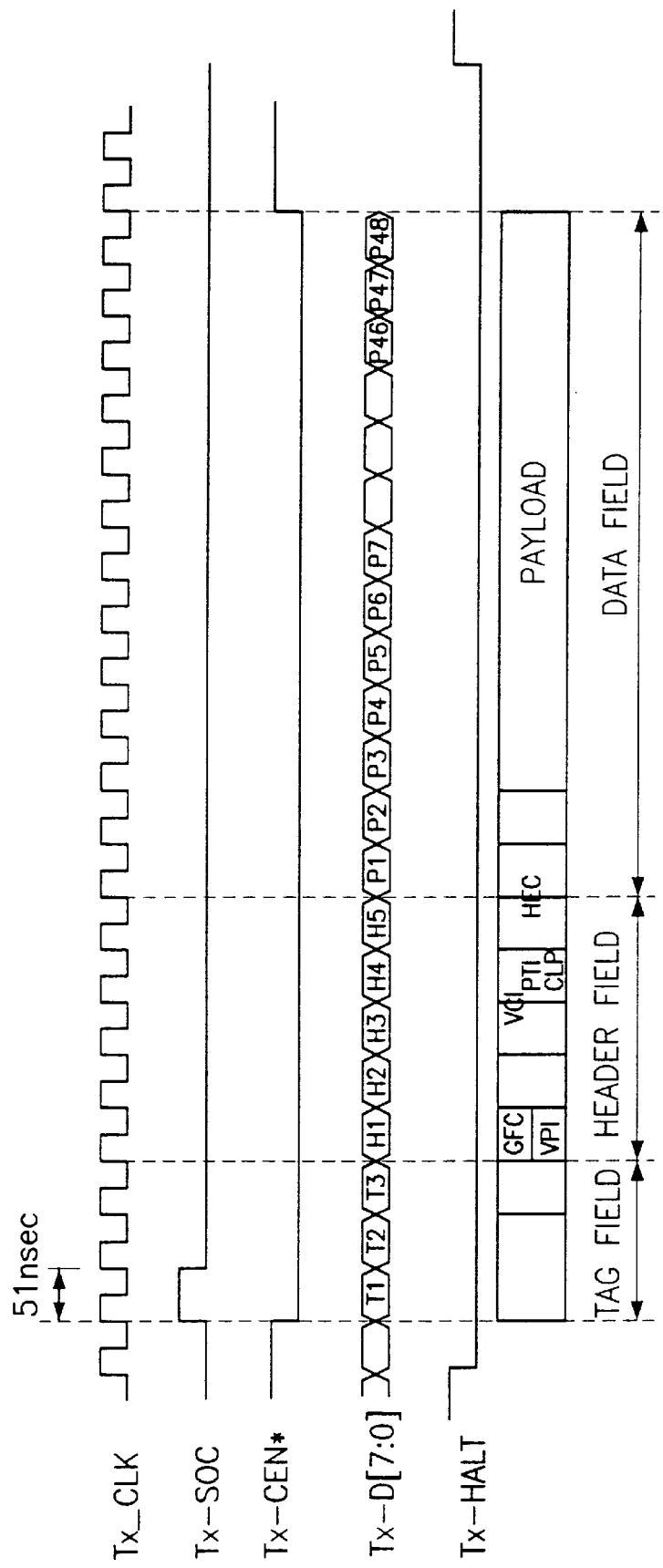

In the cell transmission after the switching operation is performed, the transmission buffer 19-1 stores a received cell therein in response to a transmission start-of-cell signal Tx-SOC and a transmission cell enable signal TX-CEN* as shown in FIG. 6B and synchronously with a transmission cell clock signal Tx-CLK as shown in FIG. 6B if it has a redundancy, namely, if Tx-HALT=0 as shown in FIG. 6B.

The ATM hierarchy processor 18 reads the cell stored in the transmission buffer 19-1. Then, the ATM hierarchy processor 18 extracts a header from the read cell and outputs the extracted cell header to the connection table 17 to change a connection identifier in the extracted cell header and supply the resultant cell header to the physical hierarchy processor 16.

The physical hierarchy processor 16 extracts an SDH transmission frame from an output cell from the ATM hierarchy processor 18 and converts the extracted SDH transmission frame into parallel data. Then, the physical hierarchy processor 16 outputs the converted parallel data to the parallel/serial converter 14-1 which converts the received parallel data into serial data and supplies the converted serial data to the electrical/optical converter 13-1.

The electrical/optical converter 13-1 converts the serial data from the parallel/serial converter 14-1 into an optical signal.

Noticeably, the header conversion means must be present in the output port drivers 12 as well as the input port drivers 11 because different output connection identifiers VPI/VCI must be assigned to the output port drivers 12 for a point-to-multipoint connection.

On the other hand, in the case where the input cell is a signalling cell or a network managing cell terminating at the system, it is extracted by the connection table 17 in the input port driver 11 and applied to the switch call processing controller 60 through the internal dedicated bus B6 (process interface bus). When the switch call processing controller 60 is required to transmit the signalling cell or the network managing cell to an adjacent node, it supplies the signalling cell or the network managing cell to the output port driver 12 through the internal dedicated bus B7 (process interface bus). Then, the output port driver 12 transfers the signalling cell or network managing cell received from the switch call processing controller 60 to the adjacent node within the limits of no effect on a user service.

Noticeably, the input dedicated bus B2 is constructed in a parallel manner in consideration of the processing speed of hardware of the present invention. In accordance with the preferred embodiment of the present invention, the input dedicated bus B2 is provided with 8 bit data bus lines, 3 bit forward control signal lines and a 1 bit reverse flow control signal line. Also, in accordance with the preferred embodiment of the present invention, the input dedicated bus B2 transmits and receives cells, each of which has a fixed length of 56 octets.

The signals on the input dedicated bus B2 are defined according to a signal protocol of FIG. 6A, which is associated with only one of the input port drivers 11 because they are the same. In FIG. 6A, the reference character -CLK designates a byte clock signal for the synchronization of cell data, the reference character -SOC designates a signal indicative of the start of a fixed length cell, the reference character -CEN designates a forward control signal indicative of a cell enable state and the reference character -HALT designates a reverse flow control signal indicative of a present transmission halt state.

Assuming that an ATM cell is inputted to the apparatus at 155.52 Mbps, it is processed in the apparatus at 19.44 Mbps. Namely, the processing speed of ATM cell is reduced from 155.52 Mbps to 19.44 Mbps. Therefore, the hardware can readily be implemented.

Figure 5:
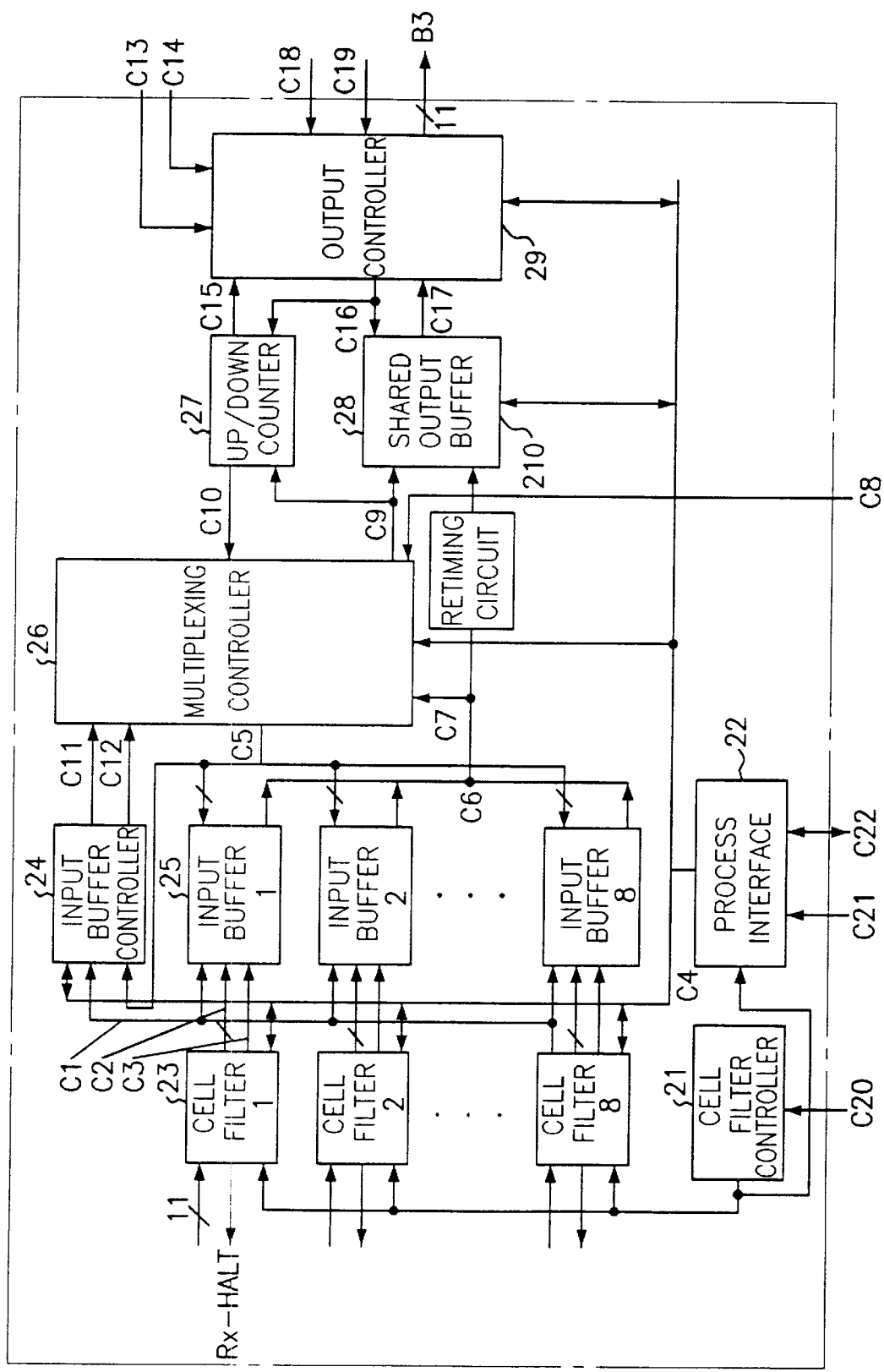
FIG. 5 is a detailed block diagram of a switch output multiplexer in FIG. 3.

FIG. 5 is a detailed block diagram of each switch output multiplexer 20 in FIG. 3. As shown in this drawing, the switch output multiplexer 20 includes a cell filter controller 21 for receiving a bit position signal and a routing tag byte position signal C20 from the switch module controller 70, decoding the received signals and generating a cell filtering control signal in accordance with the decoded result, a process interface 22 for receiving the control signal from the cell filter controller 21 and an address control signal C21 and data C22 from the switch module controller 70, and a plurality of cell filters 23, each of which receives the cell from a corresponding one of the input port drivers 11 in the line interface circuits 10 and filters the received cell in response to the control signal from the cell filter controller 21 to generate a control signal C2, a write control signal C1 and a filtered cell C3. Each cell filter 23 also outputs a reverse flow control signal Rx-HALT to the corresponding input port driver 11 when the present state is an input buffer full state, to stop the cell input therefrom.

The switch output multiplexer 20 further includes an input buffer controller 24 for counting an input buffer occupied degree in response to the write control signals C1 from the cell filters 23 and a read control signal C5 and generating a count C11 and an input buffer state flag C12, a plurality of input buffers 25, each for buffering the cell C3 from a corresponding one of the cell filters 23 in response to the control signal C2 and write control signal C1 from the corresponding cell filter 23 and outputting the buffered cell C6 in response to the read control signal C5, a multiplexing controller 26 for generating the read control signal C5 and a write control signal C9 in response to the count C11 and input buffer state flag C12 from the input buffer controller 24 and an output buffer full state flag C10 and outputting the generated read control signal C5 to the input buffer controller 24 and the input buffers 25, and an up/down counter 27 for performing an up counting operation in response to the write control signal C9 from the multiplexing controller 26 and a down counting operation in response to a read control signal C16 to generate the output buffer full state flag C10 and an output buffer empty state flag C15 and outputting the generated output buffer full state flag C10 to the multiplexing controller 26.

The switch output multiplexer 20 further includes a shared output buffer 28 for buffering the cells C6 from the input buffers 25 in response to the write control signal C9 from the multiplexing controller 26 and outputting the buffered cells C17 in response to the read control signal C16, an output controller 29 for generating the read control signal C16 in response to the output buffer empty state flag C15 from the up/down counter 27, the control signal C13 from the switch module controller 70 and the reverse flow control signal Tx-HALT C14 from the corresponding output port driver 12 and outputting the generated read control signal C16 to the up/down counter 27 and the shared output buffer 28 to receive the cells C17 from the shared output buffer 28 and transmit the received cells to the corresponding output port driver 12, and a retiming circuit 210 for retiming the cells C6 from the input buffers 25 and transferring the retimed cells to the shared output buffer 28.

In the preferred embodiment of the present invention, the cell filters 23 and the input buffers 25 are eight in number, respectively.

The switch output multiplexer 20 has the processing speed of at least twice the input speed of the cells through the input dedicated bus B2. Also, cell storage degrees of the eight input buffers 25 are used as variables. In other words, an integral number (processing speed/input speed) of input buffers are selected in the order of higher cell storage degrees. Then, cells are sequentially one by one read from the selected input buffers and stored into the shared output buffer 28.

The operation of the switch output multiplexer 20 with the above-mentioned construction in accordance with the embodiment of the present invention will hereinafter be described in detail.

Each of the eighth cell filters 23 receives a cell stream from the corresponding input port driver 11 through the input dedicated bus B2 and filters only a cell with the same cell destination address as a self address from the received cell stream. Then, each cell filter 23 stores the filtered cell into the corresponding input buffer 25 under the control of the input buffer controller 24. The multiplexing controller 26 multiplexes the cells stored in the input buffers 25 using a loaded input first output (LIFO) Q-service manner in response to the input buffer occupied information from the input buffer controller 24. At this time, the multiplexing controller 26 reads the cells stored in the input buffers 25 at the speed of at least twice the input speed of the cells through the input dedicated bus B2 to store them into the shared output buffer 28.

The output controller 29 transmits the cells temporarily stored in the shared output buffer 28 according to an external speed.

The cell filters 23 and the input buffers 25 are operated individually by input buses, so that cell streams with individual speeds and phases can be inputted. Also, an 8:1 multiplexing function can be performed by one switch output multiplexer 20.

Now, the operation of the switch output multiplexer 20 in accordance with the embodiment of the present invention will hereinafter be described in more detail.

The cell filters 23 are constructed individually by input port drivers. Namely, each cell filter 23 extracts only a cell with the corresponding output port driver address from the received cell stream. At this time, the output port driver addresses are determined by bit positions in the routing tag. For this reason, each cell filter 23 inputs only a cell with the corresponding bit being 0. External timing control means produces cell filtering timing information such that the cell input operation can be performed synchronously with a cell synchronous signal -SOC from the input port driver. The timing control means produces the timing information synchronously with a byte clock signal -CLK when the cell synchronous signal -SOC indicative of the cell start point is made active and a cell enable signal -CEN is made active (i.e., -CEN=0). Then, the timing control means applies the produced timing information as a control signal for the cell extraction and storage functions.

The cell filter controller 21 receives the bit position signal and the routing tag byte position signal C20 from the switch module controller 70 and decodes the received signals to designate bit address positions for the cell filtering operations of all the cell filters 23. As a result of the decoding operation, the cell filter controller 21 selects a desired one of byte positions of the routing tag as actual routing tag information and outputs the selected routing tag information as a control signal to the cell filters 23 and the process interface 22.

The process interface 22 receives the control signal from the cell filter controller 21 and the address control signal C21 and data C22 from the switch module controller 70 to perform an interfacing operation for controlling or monitoring the states of the components in the switch output multiplexer 20.

Each cell filter 23 is adapted to remove the influence of a cell which is not completely comprised of a desired number (e.g., 56) of bytes due to an error in transmission. In other words, when the bytes number of a cell being transmitted exceeds 56, the cell filter 23 receives only 56 bytes of the transmitted cell. In the case where the bytes number of a cell being transmitted is smaller than 56, the cell filter 23 appends "0" to the subsequent byte positions to make the transmitted cell complete. Further, the cell filter 23 may interrupt the cell reception in response to the cell filtering control signal from the cell filter controller 21.

The input buffer controller 24 is provided with up/down counters for counting the number of cells presently stored in the input buffers 25 in response to the write control signals C1 from the cell filters 23 and the read control signal C5 from the multiplexing controller 26. The up/down counters count the number of presently inputted cells and the number of presently transmitted cells to maintain the number of cells stored in the input buffers 25 constant. Because the up/down counters are operated regardless of input/output speeds and phases, any asynchronous signal can be connected thereto.

The multiplexing controller 26 generates the read control signal C5 in response to the count C11 and input buffer state flag C12 from the input buffer controller 24 and outputs the generated read control signal C5 to the input buffer controller 24 and the input buffers 25 to multiplex the cells from the input buffers 25 and assure the cell input order. Further, the multiplexing controller 26 multiplexes cells to be routed to the corresponding output port driver in response to a system synchronous clock signal C8 from the switch module controller 70.

The multiplexing controller 26 provides its service beginning with the input buffer 25 of the highest cell occupied degree. To this end, the input buffer controller 24 counts the number of cells stored in the input buffers 25 to provide the cell occupied degree information to the multiplexing controller 26. The multiplexing controller 26 classifies the input buffers 25 in the order of higher cell occupied degrees in response to the count C11 and input buffer state flag C12 from the input buffer controller 24. As a result of the classification, the multiplexing controller 26 selects an integral number of the input buffers 25 with the higher cell occupied degrees and applies the read control signal C5 to the selected input buffers 25. As a result, the cells C6 are read from the selected input buffers 25 and retimed by the retiming circuit 210. At this time, the multiplexing controller 26 applies the write control signal C9 to the shared output buffer 28 so that the retimed cells from the retiming circuit 210 can be temporarily stored in the shared output buffer 28 for the transmission. Also, the multiplexing controller 26 applies the write control signal C9 to the up/down counter 27 to monitor the cell storage degree of the shared output buffer 28.

The up/down counter 27 is adapted to count the number of cells stored in the shared output buffer 28 in response to the write control signal C9 from the multiplexing controller 26 and the read control signal C16 from the output controller 29. If the shared output buffer 28 is in its full state, the up/down counter 27 outputs the output buffer full state flag C10 to the multiplexing controller 26 to temporarily stop the multiplexing operation of the multiplexing controller 26, thereby increasing the cell storage degrees of the input buffers 25. When the input buffers 25 reach their full states with the cell storage degrees increased, the input buffer controller 26 asserts the input buffer state flag C12, thereby causing the cell filters 23 to output the reverse flow control signals (Rx-HALT=1) to request the cell transmission stop. In the case where the shared output buffer 28 is not in its empty state, the up/down counter 27 outputs the output buffer empty state flag C15 to the output controller 29 which then generates the read control signal C16 in response to a cell synchronous signal C18 and a network synchronous clock signal C19 from the switch module controller 70. The output controller 29 applies the generated read control signal C16 to the up/down counter 27 and the shared output buffer 28.

The output controller 29 also receives the cells C17 from the shared output buffer 28 and transmits the received cells with the signals as shown in FIG. 6B to the corresponding output port driver 12 in the line interface circuit 10. At this time, in the case where the reverse flow control signal Tx-HALT C14 from the corresponding output port driver 12 is asserted to disable the cell transmission to the corresponding output port driver 12, the output controller 29 temporarily stops the cell transmission to the corresponding output port driver 12 if the shared output buffer 28 is not in its full state. However, if the shared output buffer 28 is in its full state, the output buffer controller 29 continues to perform the cell transmission to the corresponding output port driver 12 to avoid a board fault.

Further, the output controller 29 may disregard the reverse flow control signal Tx-HALT C14 from the output port driver 12 in response to the control signal C13 from the switch module controller 70.

The process interface 22 is adapted to control the operation of the switch output multiplexer 20 in response to a control signal from the switch module controller 70. The process interface 22 also checks the state of the switch output multiplexer 20 and reports the checked result to the switch module controller 70.

In other words, the process interface 22 communicates with the components in the switch output multiplexer 20 through an internal bus C4 in response to the address control signal C21 and data C22 from the switch module controller 70. The process interface 22 is basically provided with a control register and a state register. The control register is adapted to control the operation of the switch output multiplexer 20 in response to the control signal from the switch module controller 70. The state register is adapted to check the state of the switch output multiplexer 20 and to report the checked result to the switch module controller 70.

As apparent from the above description, according to the present invention, the fully-interconnected ATM switching apparatus can reduce an amount of hardware required for the buffer construction, as compared with a conventional cell switching apparatus of the output buffer type provided with only input dedicated buffers. Even in the case where the traffic is surged in one output port driver, it can be processed with no excessive cell loss. Also, the fully-interconnected ATM switching apparatus of the present invention provides the speed gain effect, thereby allowing the number of required buffers to be reduced and a burst traffic to internal input buffers to be smoothly processed. With no use of a knockout concentrator and a shared buffer method employed in a conventional knockout switching apparatus, the fully-interconnected ATM switching apparatus of the present invention employs the relatively small scale dedicated buffers, the relatively large scale shared buffer and the speed gain method, so that the apparatus construction and the function component control logic can be simplified. The switch output multiplexers have a fully modularized structure. The connection of the modules based on the multistage network manner makes the scale extensibility of switching apparatus possible. Further, the switch output multiplexers have a flow control structure therebetween to perform the flow control when a temporary overflow occurs at the output stage. Therefore, the entire system operation can be protected from the temporary phenomenon and the entire system performance can thus be enhanced. Moreover, the fully-interconnected ATM switching apparatus of the present invention can perform the cell copy function to provide a broadcasting service for the simultaneous distribution to many subscribers. Therefore, the broadcasting service can be distributed to many subscribers, thereby increasing the channel efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fully-interconnected asynchronous transfer mode switching apparatus comprising:
   a plurality of line interface means, each of said plurality of line interface means including input port drive means for converting an input optical signal into an electrical signal, recovering a clock signal from the converted electrical signal, extracting a synchronous digital hierarchy transmission frame from the converted electrical signal in response to the recovered clock signal, the extracted synchronous digital hierarchy transmission frame containing cell data with a fixed length and a connection identifier, appending a routing tag to the extracted synchronous digital hierarchy transmission frame to produce a resultant synchronous digital hierarchy transmission frame, outputting the resultant synchronous digital hierarchy transmission frame and the recovered clock signal through an input dedicated bus, extracting a signalling cell or a network managing cell terminating at the apparatus from the converted electrical signal and outputting the extracted signalling cell or network managing cell through a first internal dedicated bus, and output port drive means for receiving a cell stream from an output dedicated bus, removing the routing tag from the received cell stream, translating a channel identifier in the connection identifier, transferring the resultant synchronous digital hierarchy transmission frame to an adjacent node, receiving the signalling cell or the network managing cell from a second internal dedicated bus and transferring the received signalling cell or network managing cell to the adjacent node;

system clock distribution means for receiving the recovered clock signal from said input port drive means in each of said plurality of line interface means through a clock dedicated bus, providing a clock signal synchronously with the received clock signal and according to network synchronous system and structure and distributing its self-clock signal if an error is temporarily present in the received clock signal;

initialization control means for controlling system initialization and restart operations;

switch maintenance control means for performing an entire system initialization control operation in response to initialization information and a control signal from said initialization control means and performing a switch maintenance control operation in response to the network managing cell from said input port drive means in each of said plurality of line interface means;

switch call processing control means for receiving the signalling cell or the network managing cell from said input port drive means in each of said plurality of line interface means through said first internal dedicated bus, preprocessing the received signalling cell or network managing cell, outputting the preprocessed cell to said switch maintenance control means if the received cell is the network managing cell, performing a call processing operation by analyzing a message of the preprocessed cell if the received cell is the signalling cell and outputting connection information containing a channel identifier and a routing tag to each of said plurality of line interface means when a connection is set based on the call processing operation;

switch module control means for receiving the clock signal from said system clock distribution means, performing an initialization operation under the control of said initialization control means, outputting a control signal through a control dedicated bus under the control of said switch maintenance control means, checking operation and malfunction states, reporting the checked result to said switch maintenance control means and performing a duplexed function of replacing a faulty switch board with a normal switch board; and a plurality of switch output multiplexing means, each of said plurality of switch output multiplexing means receiving successive cells from said input port drive means in said plurality of line interface means through said input dedicated buses, each of the received cells containing cell data, a cell enable signal, a start-of-cell signal and a synchronous clock signal, temporarily storing the received cells, performing a received cell selection operation to preferentially read the stored cells corresponding to ones of said input port drive means with high generation frequency and outputting the read cells through said output dedicated bus under the control of said switch module control means.

2. A fully-interconnected asynchronous transfer mode switching apparatus as set forth in claim 1, wherein each of said plurality of line interface means includes:

optical/electrical conversion means for converting the input optical signal into the electrical signal;

serial/parallel conversion means for recovering the clock signal from an output signal from said optical/electrical conversion means and converting serial bit data of the output signal from said optical/electrical conversion means into 8-bit parallel data;

process interface means for receiving a control signal and the connection information from said switch call processing means;

physical hierarchy processing means for transferring the recovered clock signal from said serial/parallel conversion means to said system clock distribution means and operating in response to the control signal received by said process interface means to extract a synchronous digital hierarchy transmission frame from the parallel data from said serial/parallel conversion means, to perform cell boundary identification and cell header error check operations with respect to the extracted synchronous digital hierarchy transmission frame to extract a busy cell therefrom, to convert an input busy cell into the synchronous digital hierarchy transmission frame and to perform a physical hierarchy function on an asynchronous transfer mode protocol containing a physical hierarchy operation and maintenance function;

connection table storage means connected to said process interface means, for storing the connection information received by said process interface means therein, said connection table storage means comparing a connection identifier in a cell header from said physical hierarchy processing means with that in the stored connection information, appending a cell format and a routing tag to the cell header in accordance with the compared result to produce a resultant cell header;

asynchronous transfer mode hierarchy processing means for receiving the busy cell from said physical hierarchy processing means and the cell header from said connection table storage means, extracting a header from the received busy cell, converting the extracted cell header to the received cell header, outputting an internal signalling cell to said switch call processing control means through said process interface means, reading a stored cell, extracting a header from the read cell, outputting the extracted cell header to said connection table storage means to change a connection identifier in the extracted cell header and supply the resultant cell header to said physical hierarchy processing means and performing an asynchronous transfer mode hierarchy function containing an asynchronous transfer mode hierarchy operation and maintenance function;

reception buffering means for receiving a cell from said asynchronous transfer mode hierarchy processing means and outputting the received cell to said plurality of switch output multiplexing means through said input dedicated bus;

transmission buffering means for receiving a cell from said corresponding switch output multiplexing means through said output dedicated bus, storing the received cell therein and outputting the stored cell to said asynchronous transfer mode hierarchy processing means;

parallel/serial conversion means for converting parallel data from said physical hierarchy processing means into serial data; and electrical/optical conversion means for converting a serial electrical signal from said parallel/serial conversion means into an optical signal.

3. A fully-interconnected asynchronous transfer mode switching apparatus as set forth in claim 2, wherein said connection table storage means equally assigns bit positions and numbers and utilizes a connection identifier in an input cell header as internal connection identifier information to assign different output connection identifiers in changing output headers, whereby a point-to-point switching function and a point-to-multipoint switching function can be performed.

4. A fully-interconnected asynchronous transfer mode switching apparatus as set forth in claim 1, wherein each of said plurality of switch output multiplexing means includes:

cell filter control means for receiving a bit position signal and a routing tag byte position signal from said switch module control means, decoding the received signals and generating a cell filtering control signal in accordance with the decoded signals;

process interface means for receiving the cell filtering control signal from said cell filter control means and an address control signal and data from said switch module control means;

a plurality of cell filtering means, each of said plurality of cell filtering means receiving a cell from a corresponding one of said input port drive means in said plurality of line interface means, filtering the received cell in response to the cell filtering control signal from said cell filter control means to generate a control signal, a first write control signal and a filtered cell and outputting a reverse flow control signal to the corresponding input port drive means when the present state is in an input buffer full state, to stop the cell input therefrom;

input buffer control means for counting an input buffer occupied degree in response to the first write control signals from said cell filtering means and a first read control signal and generating a count and in input buffer state flag;

a plurality of input buffering means, each of said plurality of input buffering means buffering the cell from a corresponding one of said plurality of cell filtering means in response to the control signal and first write control signal from the corresponding cell filtering means and outputting the buffered cell in response to the first read control signal;

multiplexing control means for generating the first read control signal and a second write control signal in response to the count and input buffer state flag from said input buffer control means and an output buffer full state flag and outputting the generated first read control signal to said input buffer control means and said input buffering means;

up/down counting means for performing an up counting operation in response to the second write control signal from said multiplexing control means and a down counting operation in response to a second read control signal to generate the output buffer full state flag and an output buffer empty state flag and outputting the generated output buffer full state flag to said multiplexing control means;

shared output buffering means for buffering the cells from said input buffering means in response to the second write control signal from said multiplexing control means and outputting the buffered cells in response to the second read control signal; and output control means for generating the second read control signal in response to the output buffer empty state flag from said up/down counting means, the control signal from said switch module control means and a reverse flow control signal from the corresponding output port driving means and outputting the generated second read control signal to said up/down counting means an said shared output buffering means to receive the cells from said shared output buffering means and transmitting the received cells to the corresponding output port drive means.

5. A fully-interconnected asynchronous transfer mode switching apparatus as set forth in claim 4, wherein each of said plurality of switch output multiplexing means further includes retiming means for retiming the cells from said input buffering means and transferring the retimed cells to said shared output buffering means.

6. A fully-interconnected asynchronous transfer mode switching apparatus as set forth in claim 4, wherein each of said plurality of cell filtering means is adapted to receive only 56 bytes of the cell transmitted from the corresponding input port drive means if the bytes number of the transmitted cell exceeds 56 and to append "0" to the subsequent byte positions of the transmitted cell to make the transmitted cell complete, if the bytes number of the transmitted cell is smaller than 56, thereby removing the influence of a cell which is not completely comprised of 56 bytes due to an error in transmission.

7. A fully-interconnected asynchronous transfer mode switching apparatus as set forth in claim 4, wherein said output control means, when the reverse flow control signal from the corresponding output port drive means is asserted to disable the cell transmission to the corresponding output port drive means, temporarily stops the cell transmission to the corresponding output port drive means if said shared output buffering means is not in its full state and continues to perform the cell transmission to the corresponding output port drive means to avoid a board fault, if said shared output buffering means is in its full state.

8. A fully-interconnected asynchronous transfer mode switching apparatus comprising:

a plurality of line interface means, each of said line interface means including input port processing means for extracting fixed length cell data with a control header from a transmission frame, for translating the control header to an internal connection identifier, for constructing a new internal cell data by appending routing tag information to the front of the cell data for cell switching, and for transmitting said internal cell data through an input dedicated bus, and output port processing means for receiving said internal cell data, for removing said routing tag from said internal data, for translating said internal connection identifier to a new control header in transmitting cell data, and for transmitting the cell data to an adjacent network system via said transmission frame;

a plurality of switch output multiplexing means, each of said plurality of switch output multiplexing means for receiving successive internal cell data from said input port processing means in said line interface means via said input dedicated bus, for filtering only internal cell data with a corresponding output port address from the cell data, for temporarily storing said filtered cell data in dedicated internal buffers into a cell data stream in order of higher cell occupied degree at a higher speed, for storing the multiplexed cell data temporarily into an output shared buffer for speed adaptation, and for transmitting said cell data in said output shared buffer to said output port processing means;

system clock distribution means for receiving a network synchronization clock and recovered clock signals from said input port processing means, for selecting a most stable clock signal among said recovered clock signals, and for distributing said selected clock signal;

initialization control means for controlling system initialization and restart operations;

switch maintenance control means for performing an entire system operation and management function in response to a control signal from said initialization control means and network management cell data extracted from said line interface means;

switch call processing control means for performing call processing and connection control function according to an extracted signalling cell data from said line interface means; and switch module control means for controlling said switch output multiplexing means in response to the control signal from said switch maintenance control means.

9. A fully-interconnected asynchronous transfer mode switching apparatus as set forth in claim 8, wherein each of said plurality of line interface means includes:

optical/electrical conversion means for converting an input optical signal into the electrical signal;

serial/parallel conversion means for recovering the clock signal from an output signal from said optical/electrical conversion means and converting serial bit data of the output signal from said optical/electrical conversion means into 8-bit parallel data;

process interface means for receiving a control signal and the connection information from said switch call processing control means;

physical layer processing means for transferring the clock signal recovered from said serial/parallel conversion means to said system clock distribution means and operating in response to the control signal received by said process interface means to extract the transmission frame from the parallel data from said serial/parallel conversion means, to perform cell boundary identification and cell header error check operations with respect to the extracted transmission frame to extract a valid cell therefrom, to convert an input valid cell into the transmission frame and to perform a physical layer function on an asynchronous transfer mode protocol containing a physical layer operation and maintenance function;

connection table storage means connected to said process interface means, for storing the connection information, for comparing a connection identifier in a cell header of input cell data with that in the stored connection information, appending a stored routing tag in said connection table storage means cell header in accordance with the compared result and producing new internal cell data for switching;

asynchronous transfer mode hierarchy processing means for receiving the valid cell from said physical layer processing means and the connection information and routing tag from said connection table storage means, outputting an internal signalling cell to said switch call processing control means through said process interface means, reading a stored cell, extracting a header from a read cell, outputting the extracted cell header to said connection table storage means to change a connection identifier in the extracted cell header to produce a resultant cell header and supply the resultant cell header to said physical layer processing means and performing an asynchronous transfer mode hierarchy function containing an asynchronous transfer mode hierarchy operation and maintenance function;

reception buffering means for receiving a cell from said asynchronous transfer mode layer processing means and outputting the received the cell to said plurality of switch output multiplexing means through said input dedicated bus;

transmission buffering means for receiving a cell from a corresponding switch output multiplexing means through said output dedicated bus, storing the received cell therein and outputting the stored cell to said asynchronous transfer mode layer processing means;

parallel/serial conversion means for converting parallel data from said physical layer processing means into serial data; and electrical/optical conversion means for converting a serial electrical signal from said parallel/serial conversion means into an optical signal.

10. A fully-interconnected asynchronous transfer mode switching apparatus as set forth in claim 9, wherein said connection table storage means equally assigns bit positions and numbers and utilizes a connection identifier in an input cell header as internal connection identifier information to assign different output connection identifiers in changing output headers, whereby a point-to-point switching function and a point-to-multipoint switching function can be performed.

11. A fully-interconnected asynchronous transfer mode switching apparatus as set forth in claim 8, wherein each of said plurality of switch output multiplexing means includes:

cell filter control means for receiving a bit position signal and a routing tag byte position signal from said switch module control means, decoding the received signals and generating a cell filtering control signal in accordance with the decoded signals;

process interface means for receiving the cell filtering control signal from said cell filter control means and an address control signal and data from said switch module control means;

a plurality of cell filtering means, each of said plurality of cell filtering means receiving a cell from a corresponding one of said input port processing means in said plurality of line interface means, filtering the received cell in response to the cell filtering control signal from said cell filter control means to generate a control signal, a first write control signal and a filtered cell and outputting a reverse flow control signal to a corresponding input port processing means when the present state is an input buffer full state, to stop the cell input therefrom;

input buffer control means for counting an input buffer occupied degree in response to the first write control signal from said cell filtering means and a first read control signal and generating a count and an input buffer state flag;

a plurality of input buffering means, each of said plurality of input buffering means buffering the cell from a corresponding one of said plurality of cell filtering means in response to the control signal and first write control signal from a corresponding cell filtering means and outputting the buffered cell in response to the first read control signal;

multiplexing control means for generating the first read control signal and a second write control signal in response to the count and input buffer state flag from said input buffer control means and an output buffer full state flag and outputting a generated first read control signal to said input buffer control means and said input buffering means;

up/down counting means for performing an up counting operation in response to a second write control signal from said multiplexing control means and a down counting operation in response to a second read control signal to generate the output buffer full state flag and an output buffer empty state flag and outputting the generated output buffer full state flag to said multiplexing control means;

shared output buffering means for buffering the cells from said input buffering means in response to the second write control signal from said multiplexing control means and outputting the buffered cells in response to the second read control signal; and output control means for generating the second read control signal in response to the output buffer empty state flag from said up/down counting means, the control signal from said switch module control means and a reverse flow control signal from a corresponding output port driving means and outputting the generated second read control signal to said up/down counting means and said shared output buffering means to receive the cells from said shared output buffering means and transmitting the received cells to the corresponding output port drive means.

12. A fully-interconnected asynchronous transfer mode switching apparatus as set forth in claim 11, wherein each of said plurality of switch output multiplexing means further includes retiming means for retiming the cells from said input buffering means and transferring the retimed cells to said shared output buffering means.

13. A fully-interconnected asynchronous transfer mode switching apparatus as set forth in claim 11, wherein each of said plurality of cell filtering means is adapted to receive only 56 bytes of the cell transmitted from a corresponding input port processing means if the bytes number of the transmitted cell exceeds 56, and to append 0 to the subsequent byte positions of the transmitted cell to make the transmitted cell complete, if the bytes number of the transmitted cell is smaller than 56, thereby removing the influence of a cell which is not completely comprised of 56 bytes due to an error in transmission.

14. A fully-interconnected asynchronous transfer mode switching apparatus as set forth in claim 11, wherein said output control means, when the reverse flow control signal from the corresponding output port drive means is asserted to disable the cell transmission to the corresponding output port drive means, temporarily stops the cell transmission to the corresponding output port drive means if said shared output buffering means is not in its full state and continues to perform the cell transmission to the corresponding output port drive means to avoid a board fault, if said shared output buffering means is in its full state.

* * * * *